US007143119B2

(12) United States Patent
Furukawa et al.

(10) Patent No.: US 7,143,119 B2
(45) Date of Patent: Nov. 28, 2006

(54) STORAGE MANAGING COMPUTER AND PROGRAM RECORDING MEDIUM THEREFOR

(75) Inventors: Hiroshi Furukawa, Sagamihara (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 10/375,199

(22) Filed: Feb. 28, 2003

(65) Prior Publication Data

US 2004/0083401 A1 Apr. 29, 2004

(30) Foreign Application Priority Data

Oct. 29, 2002 (JP) ............................ 2002-313612

(51) Int. Cl.
G06F 12/00 (2006.01)
G06F 17/30 (2006.01)
(52) U.S. Cl. ........................................ 707/202; 707/10
(58) Field of Classification Search .................. 714/4, 714/7; 711/170, 112; 707/200, 202, 10
See application file for complete search history.

(56) References Cited

U.S. PATENT DOCUMENTS

| 5,873,085 | A | 2/1999 | Enoki et al. | |
|---|---|---|---|---|
| 6,173,413 | B1 * | 1/2001 | Slaughter et al. | 714/6 |
| 6,571,257 | B1 * | 5/2003 | Duggan et al. | 707/202 |
| 6,826,580 | B1 * | 11/2004 | Harris et al. | 707/202 |
| 2002/0099914 | A1 | 7/2002 | Matsunami et al. | |
| 2002/0199071 | A1 | 12/2002 | Kitamura et al. | |
| 2003/0196037 | A1 | 10/2003 | Obara et al. | |
| 2004/0044698 | A1 | 3/2004 | Ebata et al. | |

FOREIGN PATENT DOCUMENTS

JP 2001-142648 5/2001

OTHER PUBLICATIONS

Veritas Volume Manager™ 3.2 for Solaris, Administrator's Guide, Aug. 2001, Veritas Software Corp.*

* cited by examiner

Primary Examiner—Greta Robinson
Assistant Examiner—Kuen S. Lu
(74) Attorney, Agent, or Firm—Mattingly, Stanger, Malur & Brundidge, P.C.

(57) ABSTRACT

A managing computer is connected to object computers, the managing computer being connected to the object computers and the storage which is connected to the object computers for managing the object computers and the storage. The managing computer includes an interface for receiving volume managing information relating to storage areas in the storage, file sharing information relating to file sharing in the storage which is provided by the object computers and storage managing information relating to the storage, and a control unit which specifies the object computers or the storage to be preset controlled according to the volume managing information, the file sharing information and the storage managing information for managing the object computers and the storage by instructing the specified object computers or the specified storage to carry out the preset control.

10 Claims, 5 Drawing Sheets

MOUNT INFORMATION OF Host 1

| MOUNT POINT /601 | VOLUME NAME /602 |
|---|---|
| A | Vol 1 |
| ⋮ | ⋮ |

MOUNT INFORMATION OF Server 1

| MOUNT POINT /601 | VOLUME NAME /602 |
|---|---|
| B | Vol 2 |
| C | Vol 3, Vol 4 |
| ⋮ | ⋮ |

FIG. 7

FILE SHARING INFORMATION OF Server 1

| SHARING NAME /701 | MOUNT PATH /702 | ACCESS PERMITTED CLIENT /703 | ACCESS RIGHT /704 |
|---|---|---|---|
| a | B¥XYZ | Client 1<br>Client 2 | R/W<br>R |
| b | B¥STU | Client 1<br>Client 3<br>Client 4 | R/W<br>R<br>R/W |
| ⋮ | ⋮ | ⋮ | ⋮ |

FIG. 8

| HOST NAME /801 | SERVER NAME /802 |
|---|---|
| Host 1 | Server 1 |
| Host 2 | Server 3<br>Server 4 |
| ⋮ | ⋮ |

STORAGE MANAGING COMPUTER AND PROGRAM RECORDING MEDIUM THEREFOR

BACKGROUND OF THE INVENTION

The present invention relates to a configuration and method of management in a computer system having a storage, in particular to a configuration and method of integrating the fault management and preset control of a storage and a plurality of computers which are connected to the storage.

Recently, an amount of digital information which is dealt by computer systems which are used in entities has been drastically increased. In association with this, the capacity of a disk volume which is a storage area for storing data thereon has been steadily increased. In order to cope with such an increase in the capacity of the disk volume, the number of devotedly used storages which are connected over networks such as fiber channels and are independent of a main computer and have a plurality of disk volumes having a large capacity which are shared by a plurality of computers has been increasing.

On the other hand, there are various forms of provision of computers using the storages depending upon the utilization of client computers. An example of the above-mentioned typical form of providing computers includes SAN (Storage Area Network) and NAS (Networked Attached Storage). SAN uses host computers so that it is able to achieve a high rate data access by conducting input/output of data in the level of block of a disk to and from the disk volume. On the other hand, NAS uses a file server computer to enable a plurality of client computers to share a file which is data by conducting input/output of data in the level of file to and from the disk volume.

A form of provision of computers (referred to as "NAS over SAN") in which both above-mentioned SAN and NAS are advantageously used so that both computers for a file server and a host are provided and are associated, a data access from a client computer is processed in unit of file and actual input/output of data to and from the disk volume is conducted in the level of block has recently been emerged.

For example, JP-A-2001-142648 (Publication 1) aims at optimally assigning disk volumes to computers using storages by associating managing means on the storage side with managing means on the computer side.

In Publication 1, the occurrence of a fault is informed to a managing console of the storage if the fault occurs in, for example the storage, but it is not informed to the managing console of a computer having a relationship of connection with the storage. Accordingly, it is necessary for a manager to carry out controls such as inhibition of the connection to a client on the side of related computer by using the managing console of the computer after reference to the configuration information such as connection relationship between the storage and computer. In an environment of NAS over SAN, it is necessary for both a host computer on the side of SAN environment and a file server on the side of NAS environment to operatively carry out the preset control such as afore-mentioned connection inhibition by using respective managing consoles.

In Publication 1, it is necessary for a manager to instruct preset control which will not cause any contradiction over the whole system, from each managing console after considering the connection relationship between the storage and the computer system and between the computers themselves if any of various preset controls such as configuration change is instructed.

In order to carry out the preset control without causing any contradiction over the whole of the system when a fault occurs or the configuration of the storage is changed. The type of preset controls such as client connection inhibition, file sharing inhibition, disk volume mount inhibition and object volume closing should be appropriate, the order of a plurality of presetting controls should be appropriate and an object device which is to be controlled for inhibition is appropriate. Accordingly, a computer system having a storage and a plurality of computers should have a capability of associating storage and computers in response to the fault occurrence information.

SUMMARY OF THE INVENTION

It is an object of the present invention to provide a configuration and method which enables the whole of a system to conduct the preset control without any contradiction when a fault occurs or when the system configuration is changed.

A managing computer of one embodiment of the present invention is connected to a plurality of object computers and a storage which is connected to the object computers for managing the object computers and the storage. The managing computer comprises an interface for receiving volume managing information relating to storage areas in the storage, file sharing information relating to file sharing in the storage which is provided by the object computers and storage managing information relating to the storage, and a control unit which specifies the object computers or the storage which is to be preset controlled in accordance with the volume managing information, the file sharing information and the storage managing information for managing the object computers and the storage by instructing specified object computers or specified storage to carry out the preset control.

In the above-mentioned embodiment, the interface preferably further receives fault information from the object computers or the storage and the control unit preferably specifies the object computers or the storage to be preset controlled in accordance with the fault information, the volume managing information, the file sharing information and the storage managing information for instructing specified object computers or the storage to carry out the preset control.

In the above-mentioned embodiment, the control unit preferably specifies the object computers or the storage to be preset controlled in accordance with the volume managing information, the file sharing information and the storage managing information for instructing specified object computers or storage to carry out specified type of preset control. The type of the preset control preferably includes any one of client connection inhibition, file sharing inhibition, disk volume mount inhibition and access inhibition in the level of storage.

In the above-mentioned embodiment, the control unit specifies the object computers or the storage to be preset controlled in accordance with the volume managing information, the file sharing information and the storage managing information, and if the preset controls are plural, further specifies the order of execution of the preset controls for instructing specified the object computers or the storage to carry out the preset controls in specified order.

In the above-mentioned embodiment, the interface preferably receives cluster information for sharing an access request to the storage area with the other object computers from the object interface, and the control unit preferably specifies the object computers or storage to be preset controlled in accordance with the cluster information, the volume managing information, the file sharing information and the storage managing information for instructing the specified object computers or the storage to carry out the preset control.

An integrated managing computer of another embodiment of the present invention is a storage integrated managing means which is operated on a plurality of object computers, a storage which is connected to the object computers and a managing computer which is connected to the object computers and the storage for managing the object computers and the storage. The integrated managing program enables the managing computer to function as means for receiving volume managing information relating to storage areas in the storage which is connected to the target computers and file sharing information relating to file sharing in the storage which is provided by the object computers and storage managing information relating to the storage from the storage. The integrated managing program enables the managing computer to function as control means for managing the specified target computers and storage by specifying the object computers or the storage which is to be preset controlled in accordance with the volume managing information, the file sharing information and the storage managing information for instructing the specified object computers or the specified storage to carry out the preset control.

Other objects, features and advantages of the invention will become apparent from the following description of the embodiments of the invention taken in conjunction with the accompanying drawings.

DESCRIPTION OF THE EMBODIMENTS

Figure 1:
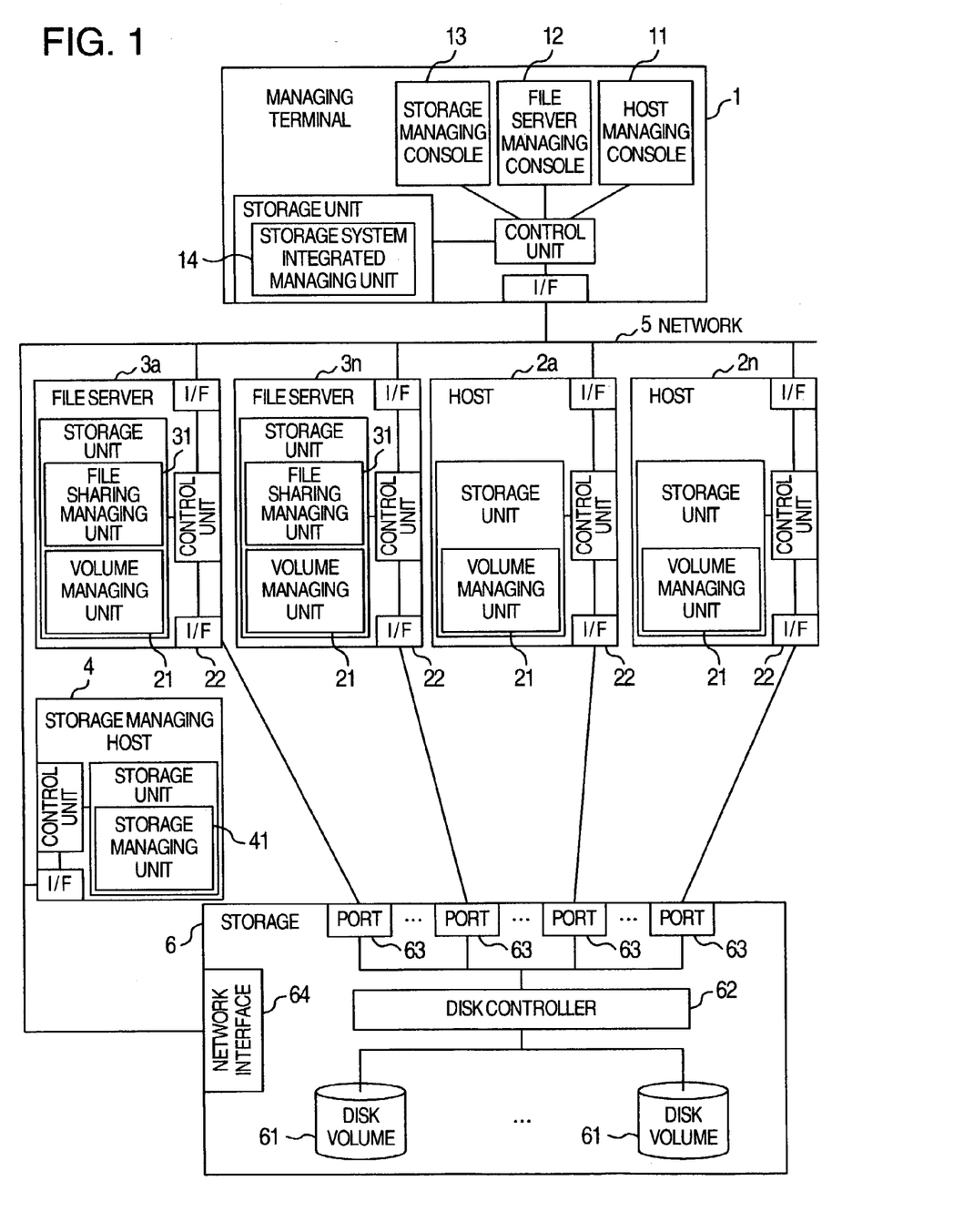
FIG. 1 is a schematic block diagram showing a first embodiment of the present invention.

FIG. 1 is a schematic block diagram showing the configuration of a first embodiment of the present invention.

A computer system of the embodiment comprises a managing terminal 1, host computers 2a to 2n (generally referred to as "host"), file server computers 3a to 3n (generally referred to as "file server"), host computer 4 which is devotedly used for storage management, network 5 and independent storages 6 which are connected to the host 2 and the file server 3.

The managing terminal 1, host 2, file server 3 and host computer 4 which is used for only the storage management are computers each having a control unit and a storage unit. Predetermined functions which are executed on each computer are implemented by a CPU reading and executing an operating system and application programs which are stored in the storage unit.

The managing terminal 1 is a managing computer and has a storage unit; a control unit for controlling the execution of the operating system and application programs which are stored in the storage unit; consoles which receive management instructions for managing the host 2, file server 3, host 4 for managing the storage and the storage 6; and an interface (I/F) for the communication over the network 5.

The host 2 and the file server 3 are object computers which are managed by the managing terminal 1, and each of them has a storage unit, a control unit for executing an operating system and application programs which are stored in the storage unit, an interface (I/F) for communication over the network 5 and an interface (I/F) 22 for communication with the storage 6.

The storage managing host 4 is an object computer which is managed by the managing terminal 1 and has a storage unit; control unit for executing an operating system and application programs, etc. which are stored in the storage unit and an interface (I/F) for communication over the network.

The storage 6 has a plurality of disk volumes 61; disk controller 62; a plurality of ports 63 which are connected to the host 2 and the file server 2; and a network interface 64 which is connected to the network 5.

The disk controller 62 is responsible for control of the disk volume 61 and control of an access from the host 2 and the file server 3. Configuration information such as connection relationships between the disk volume 61 and the host 2 or file server 3, state information and performance information of the disk volumes 61 and the ports 63 is managed. The managed information is sent to the storage managing devoted host computer 4 over the network 5 in a regular manner or in synchronization with changes in the configuration or state information.

The disk controller 62 is adapted to control an access to a physical area which is specified by the volumes 61 (permission of read or write) in accordance with an access request issued by the execution of the application program on a client computer (which access request specifying the logical address of the volume 61 to be accessed) and a logical to physical conversion table which defines correspondence relationships between the logical and physical addresses of the volume 61. The disk controller 62 is able to execute the inhibition of an access to a volume in the level of the storage 6 by deleting an address of the volume on the logical to physical conversion table. The disk volume 61 is one or more disk unit devices in a hardware sense and is made of a RAID (Redundant Arrays of Inexpensive Disks) system. Since the description of the hardware of the disk volume is not essential to understand the present invention, the invention will be described with reference to the volume which is a logical management unit which is connected to the host 2 and the file server 3 for the simplicity of the description.

Figure 5:
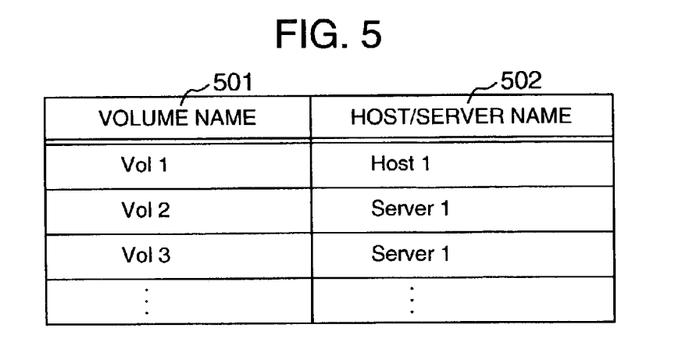
FIG. 5 is a table showing exemplary configuration information managed by storage managing means.

FIG. 5 is a table showing exemplary configuration information which is related with the connection relationship between the disk volumes 61 and the host 2 or file server 3. The table in FIG. 5 is held by the storage managing means 41 of the storage managing devoted host 4. In the table of FIG. 5, at least identification information of the host 2 and the file server 3 which are connected to each of the volumes 61 exists with respect to an entry 501 of the disk volume 61 present in the storage 6. The present table information is only an example. If the information contains the connection relationship between the disk volumes 61 and the host 2 or the file server 3, the form of the information does not manner.

The storage managing means 41 informs the storage management console 13 of the management terminal 1 of the occurrence of a fault in accordance with fault information from the storage 6 and the table in FIG. 5. The function of the storage managing means 41 is implemented by a program which is executed by the control unit of the storage managing host 4.

The ports 63 are connected to the interfaces 22 of the host 2 and the file server 3 and are paths through which data input/output requests processed by the host 2 and the file server 3 are passed. Preferable examples of the path may include at least SCSI (Small Computer System Interface) channel, ESCON (registered trademark of U.S. International Business Machines Corp. in U.S. and other countries) channel and fibre channel. Different types of ports 63 and the interfaces 22 on the side of the each computer may exist.

Difference between the host 2 and file server 3 which are connected to the storage 6 resides in that the host conducts input/output of data in the block level of the disk for the disk volume 61 for implementing a high rate data access function, while the file server 3 conducts input/output of data in the level of file for the disk volume 61 to provide a function for sharing a file which is data for a plurality of client computers. Although the present embodiment is configured so that both of plural hosts 2 and file servers 3 are connected to the storage 6, it may be configured so that only one of the hosts 6 and file server 3, and one or more computers are connected to the storages 6.

The configuration and operation of the managing means which has been executed by a manager in the computer system which has been described with reference to FIG. 1 will be described.

Volume managing means 21 is disposed on each host 2. The volume managing means 21 preset controls input/output of each host 2 which is connected to the disk volume 61 of the storage 6 to and from at least the disk for executing the management of the configuration and performance information. The function of the volume managing means 21 is implemented by software (program) on the host being executed on the operating system by the control unit (for example, CPU) of the host 2.

Figure 6:
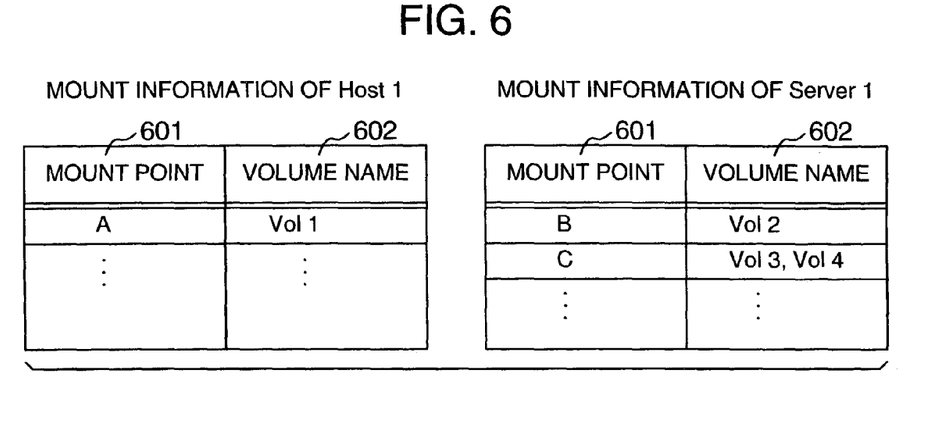
FIG. 6 is a table showing exemplary configuration information managed by volume managing means.

FIG. 6 is a table showing exemplary configuration information relating to the input/output to and from the disk. The table of FIG. 6 is held by the volume managing means 21 of the host 2 and file server 3.

At least a point 601 which is a unit for managing the disk volume and identification information 602 of the disk volume 61 for each point 601 are present in the table of FIG. 6. The point 601 is designated by the host 2 or the file server 3 mounting the volume 61. A word "mount" used herein means that the disk volume 61 is recognized to enable an access to the disk volume 61 on the host 2 or file server 3. The table information is only exemplary. If the information contains information for managing the disk volume 61 by each host 2, the form of the information does not matter.

The volume managing means 21 of the host 2 and file server 3 manages an access to the volume 61 in accordance with the content in the table of FIG. 6. The volume managing means of the host 2 and file server 3 is capable of inhibiting the opening of the disk volume by deleting the mount point on the table of FIG. 6.

In order for a manager to conduct a preset control and information management of the volume managing means 21 on each host 21, the host managing console 11 on the management terminal 1 is used.

The volume managing means 21 and file sharing managing means 31 are disposed on each file server 3. The file sharing managing means 31 preset controls at least file sharing for the client computer which uses the file server 3 and executes the management of the configuration information and performance information. The function of the file sharing managing means 31 is implemented with the function of the volume managing means 21 by execution of software (program) on the file server 3 on the operating system by the control unit (for example, CPU).

Figure 7:
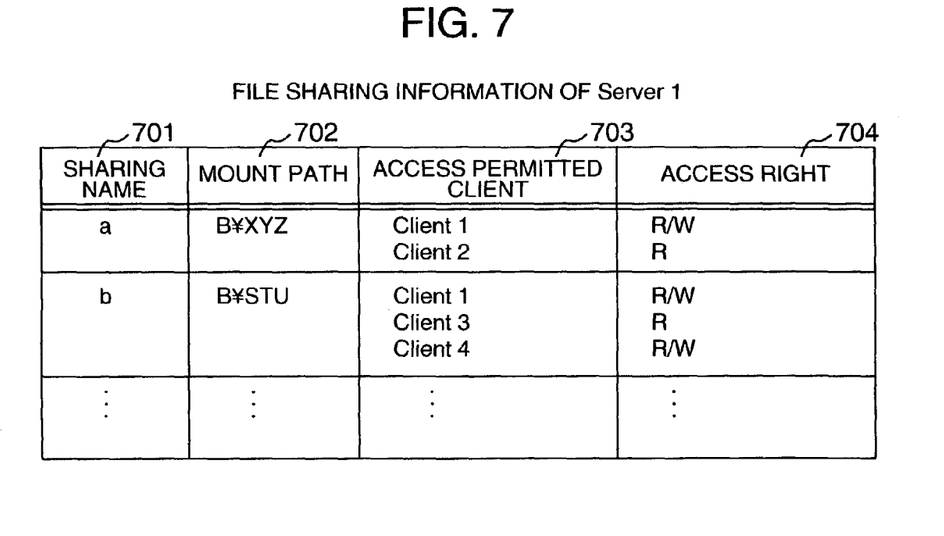
FIG. 7 is a table showing exemplary configuration information managed by file sharing managing means.

FIG. 7 is a table showing exemplary configuration information relating to file sharing with the client computer. The table of FIG. 7 is held by the file sharing managing means 31 of the file server 3.

At least file sharing names 701, each of which is a unit in which a file is shared with a client computer by each file server 3; mount path information 702 for designating the disk volume 61 in which a file is shared; identification information 703 which represents a client computer which is allowed to share the file; and information 704 which represents the type for permitting the access right on sharing with each client computer (for example, read, write, file open, etc.) are present on the table of FIG. 7. Although the mount path information 702 specifies the disk volume 61 which shares a file by designating the mount point in FIG. 6 in the present embodiment, it may directly specify the volume name 602. The present table information is only exemplary. If the information contains information for sharing a file with the client computer by each file server 3, the form of the information does not matter.

The file sharing means 31 of the file server 3 manages the file sharing in accordance with the content in the table of FIG. 7. The file sharing means 31 of the file server 3 inhibits the file sharing by deleting the specified sharing name 701 on the table of FIG. 7. The file sharing means 31 inhibits the client connection by deleting the access permission client 703 of the specified client computer on the table of FIG. 7.

In order for the manager to conduct the preset control and information management of the volume managing means 21 and the file sharing managing means 31, the file server managing console 12 on the management terminal 1 is used.

Storage managing means 41 is disposed on the storage management devoted host computer 4. The function of the storage managing means 41 is implemented by the execution of software (program) on the storage management devoted host computer 4 on the operating system by the control unit (for example, CPU) in the storage management devoted host computer 4. The storage managing means 41 has functions for managing the state information and performance information of the disk volume 61 and port 63 which is fed from the storage 6 and for preset controlling the configuration of the storage 6 such as connection relationship with the host 2 and the file server 3 using the disk controller 62. In order for the manager to conduct the preset control and information management of the storage managing means 41 on the storage management devoted host computer 4, the storage managing console 13 on the management terminal 1 is used.

As mentioned above, the managing means and managing consoles of the computer system have heretofore been separately provided, there have been following problems for the manager to manage the computer system.

If a fault occurs on hardware in, for example, the storage 6, the storage managing means 41 informs the storage managing console 13 of the ocurrence of the fault in accordance with the fault information from the storage 6 and the table of FIG. 5. However, the fault information is not informed to the host 2 and each managing consoles 11, 12 of the file server 3 which are related with the hardware in which the fault occurs. Accordingly, upon occurrence of the fault, it is not possible to activate the preset control which is required in the host 2 and file server 3 in association of the fault.

If a fault occurs in, for example, "Vol 1" of the disk volume 61 which is exemplarily shown in Table of FIG. 5, the fault information is informed to the storage managing console 13, but is not informed to the managing console 11 of the host 2. On the other hand, as shown by the exemplary table which is held by the volume managing means 21 on the "Host 1" of the host 2 which is shown in FIG. 6, "Vol 1" in which a fault has occurred is mounted on "Host 1" by the Volume managing means 21, and various application programs are executed. In order to inhibit the mount of the disk volume by stopping the mount point, it is necessary for the managing console 11 of the host 2 to execute processing related with the inhibition of the mount of the disk volume. Since the fault information which causes the execution of the processing is not fed to the host managing console 11, it is not possible to cause the host managing console 11 to operate in response to the fault.

If an fault occurs in "Vol 2" of the disk volume 61 as is exemplarily shown in table of FIG. 5, its fault information is informed to the storage managing console 13, but it is not informed to the managing console 12 of the file server. As is shown in the example of the table which is held by the volume managing means 21 and file sharing means 31 on "Sever 1", of the file server 3 as is shown in FIGS. 6 and 7, "Vol 2" in which a fault has occurred is mounted by the volume managing means 21 and shares a file by the file sharing means 31, so that the client computer and the like use a file in a sharing basis. In order to inhibit file sharing and to inhibit the connection from a given client computer (to inhibit the client connection) by stopping the file sharing or temporarily deleting the client to which an access is allowed, it is necessary for the managing console 12 of the file server 3 to inhibit the file sharing or to execute the processing relating to the inhibition of the client connection. Since the fault information which causes the execution of the processing is not fed to the managing console 12, it is not possible to operate the managing console 12 in response to the fault.

If the manager instructs the preset control of the configuration information in the storage 6 by using the storage managing means 41 from the storage managing console 13, it is also necessary to instruct the preset control to the volume managing means 21 and the file sharing means 31 of the host 2 and the file server 3 which are connected to the storage which is related with the instruction of the presetting and control.

Specifically, if a change in the configuration of the disk volume 61 is instructed, the table information relating to FIG. 5 can be changed from the storage managing console 13. Since the volume managing means 21 newly recognizes the disk volume information in association therewith and changes the table information relating to FIG. 6 and opens the file sharing of the disk volume 61 to the client by the file sharing managing means 31, control is necessary to change the table information related to FIG. 7. Since each of the managing consoles 11, 12, 13 does not have any functions to conduct associated control, it is not possible to automatically change and control the information in each of managing tables.

As described above, associated operation of each managing means is necessary in the computer system of FIG. 1 when a fault occurs or when the preset control is conducted. In an embodiment of the present invention, a storage system integrated managing means 14 is disposed on the management terminal 1 in order to overcome these problems. The functions of the storage integrated managing means 14 are implemented by the execution of software (program) on the managing terminal 1 on the operating system by the control unit (for example, CPU) of the management terminal 1.

The storage integrated managing means 14 execute the processing for solving the above-mentioned problems in association with the volume managing means 21, file sharing managing means 31 and the storage managing means 41. In other words, the storage integrated managing means 14 receives the content of the table of FIG. 5 which is managed by the storage managing means 41, the content of the table of FIG. 6 which is managed by the volume managing means 21 and the content of the table of FIG. 7 which is managed by the file sharing managing means 31. They may be received regularly or when the configuration is changed.

The storage integrated managing means 14 manages the host 2, file server 3 and storage 4 in accordance with the fault information or configuration change information and the content of FIGS. 5, 6 and 7 when a fault occurs or the configuration changes in the storage, so that it executes the presetting control as a whole of the system without any contradiction. Specifically, the storage integrated managing means 14 specifies the type of appropriate preset control (inhibition of client connection, inhibition of file sharing, inhibition of disk volume mount, inhibition of an access in the level of storage, etc.) and the object device 2, 3, 6 to which the preset control is to be instructed in accordance with the contents of FIGS. 5, 6 and 7. Subsequently, the storage integrated managing means 14, instructs the specified host 2 (volume managing means 21), file server 3 (file sharing means 31) and the storage 6 (disk controller 62) to execute the preset control in accordance with the specified contents. If a plurality of preset controls are necessary, the storage integrated managing means 14 specifies the order of the execution of the presetting control in accordance with the contents of FIGS. 5, 6 and 7 and instructs each of the consoles 11 through 13 to execute the preset control in accordance with the specified contents. Although the storage system integrated managing means 14 is disposed in the managing terminal 1 in the present embodiment, the functions for performing these functions may be provided at any place such as host 2, file server 3, storage managing devoted host computer 4 and the storage 6 which are connected to the managing terminal 1 via the network 5. Although three managing consoles are disposed on the managing terminal in the present embodiment, these three managing consoles may be integrated into one exclusively used console (hereinafter referred to as integrated managing console) which is relevant to the storage system integrated managing means 14.

Figure 3:
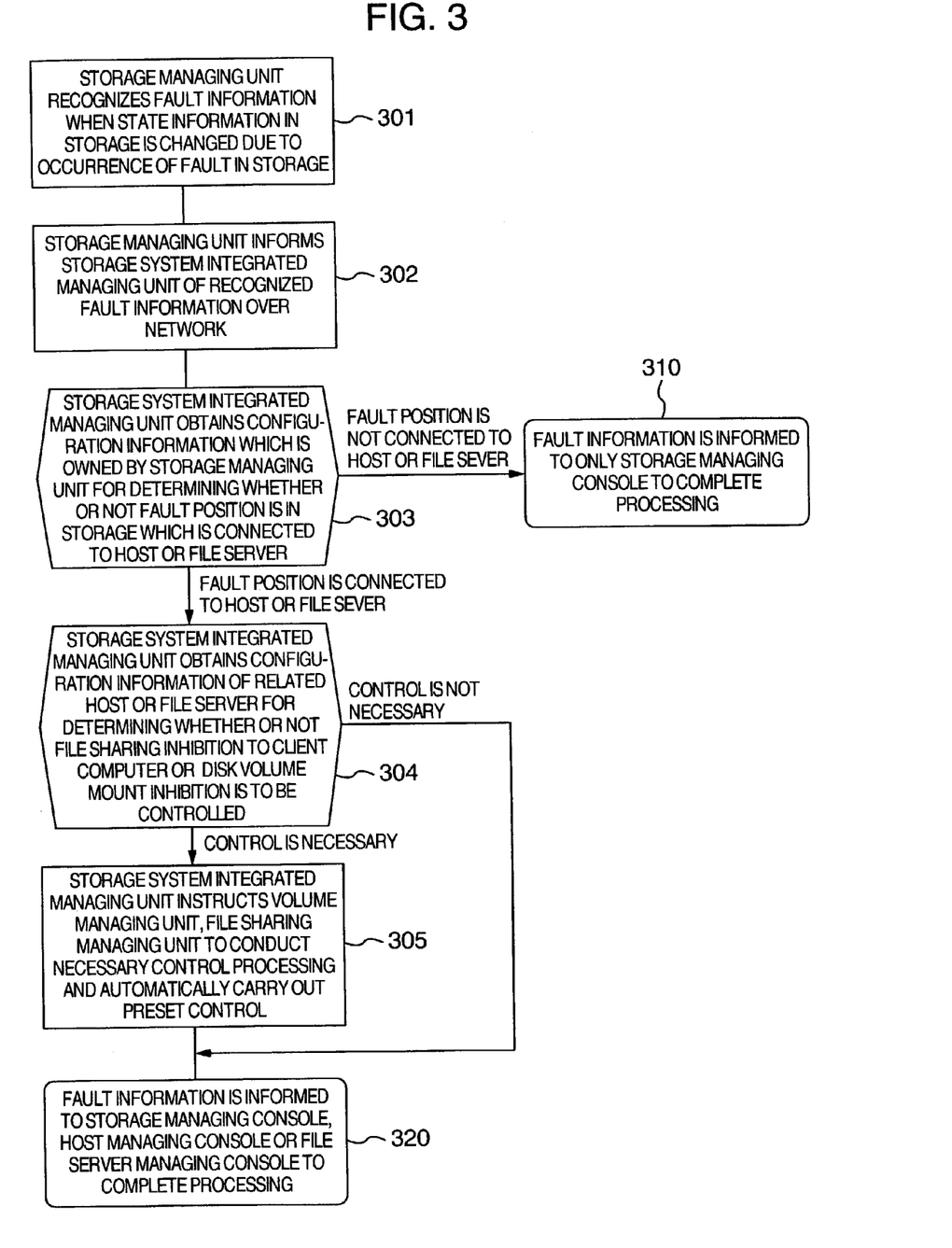
FIG. 3 is a flowchart showing a fault processing.

FIG. 3 is a flowchart showing the processing in the event of a fault in the storage 6 in the first embodiment.

Since the state information in the storage 6 is changed when the fault occurs in the storage 6, the storage managing means 41 receives a change in the state information in the storage 6 as fault information to recognize the occurrence of the fault in the storage (step 301).

The storage managing means 41 informs the storage system integrated managing means 14 on the managing terminal 1 of the fault information which has been received at step 301 over the network 5 (step 302).

The storage system integrated managing means 14 obtains the information of FIGS. 5, 6 and 7 and determines whether or not the fault position represented by the fault information which is informed at step 302 is the volume 61 which is connected to the host 2 or the file server 3 based upon the fault information (step 303).

If it is not determined at step 303 that the fault position is the volume 61 which is connected to the host 2 or the file server 3, the storage system integrated managing means 14 informs the storage managing console 13 of the fault information in a normal manner (step 310).

If it is determined at step 303 that the fault position is the volume 61 which is connected to host 2 or file server 3, the host 2 or the file server 3 which has a connection relationship with the faulty volume 61 is specified based upon the fault information and the information of FIGS. 5, 6 and 7 so that the type of preset control to be conducted responsive to the occurrence of the fault (including a case in which the preset control is not necessary) is determined (step 304). In other words, determinations whether or not the host 2 or the file server 3 only allocates the resource of the faulty position in the storage 6, whether or not file sharing is preset to the client computer and whether or not there is an application program using its disk volume are made based upon the information of FIGS. 5, 6 and 7.

If preset control such as inhibition is necessary at step 304, the storage system integrated managing means 14 instructs appropriate host 2, file server 3, volume managing means 21 of the storage managing host 4, file sharing managing means 31 and storage managing means 41 to preset control the specified control processing (step 305). Alternatively, the storage system integrated managing means 14 may specify consoles 11 through 13 to be instructed and issue an instruction of the preset control via the consoles 11 to 13.

Now, preset control will be described in detail. "Client connection inhibition" means the inhibition of the connection between the specified client computer and the volume and is implemented by deleting the information of the access permitted client 703 of the table of FIG. 7 by the file sharing means. In the present embodiment, determination whether or not the connection inhibition is to be conducted is made by determination whether or not a client computer which is connected with the faulty position in the storage 6 exists and whether or not its client computer is registered in "access permitted client 703" based upon the tables of FIGS. 6 and 7. In other words, the storage system integrated managing means 14 determines that the client connection inhibition is carried out as one type of preset control if it is determined based upon the tables of FIGS. 6 and 7 that a client computer which is connected with the faulty position in the storage 6 exists and that any client computer is registered in "access permitted client 703".

"File sharing inhibition" means that sharing of a volume which is shared by a plurality of client computers is inhibited and is implemented by deleting the information on the sharing name 701 on the table information of FIG. 7 by the file sharing means. Determination whether or not the file sharing inhibition is carried out is made by making a determination based upon the tables of FIGS. 6 and 7 whether or not a client computer which is connected to the faulty position in the storage 6 exists and whether or not the client computer is registered in "access permitted client 703"). In other words, the storage system integrated managing means 14 determines that the file sharing inhibition is carried out as one type of preset control if it is determined based upon the tables of FIGS. 6 and 7 that the client computer which is connected to the faulty position in the storage 6 and that all client computers are registered in "access permitted client 703".

"Disk volume mount inhibition" means that an access is inhibited in unit of volume and is implemented by deleting the information of "mount point 601" on the table of FIG. 7 by the volume managing means 21. Determination whether or not the disk volume mount inhibition is carried out is made by making determination based upon the table of FIG. 7 whether the client computer which is connected to the faulty position in the storage 6 exists and whether or not "mount point 601" for the volume 61 in which a fault has occurred is registered.

In other words, the storage system integrated managing means 14 determines that the inhibition of the mount of the disk volume is carried out as a type of preset control based upon the tables of FIGS. 6 and 7 if no client computer which is connected with the volume 61 in which the fault has occurred exists and "mount point 601" for the volume 61 in which a fault has occurred is registered.

The type of preset control such as client connection inhibition, file sharing inhibition, disk volume mount inhibition and access inhibition in the level of storage may be specified based upon the fault information as well as the above-mentioned information of FIGS. 5, 6 and 7. For example, when a fault occurs in the interface 22 of the host 2, there is no effect even if inhibition in the level of storage 6 (inhibition of an access in the level of storage) is carried out. Accordingly, any one of client connection inhibition, file sharing inhibition and disk volume mount inhibition can be determined as one type of preset control. Although the above-mentioned preset control is an example, processing in the event of fault can be conducted by carrying out other control processing.

If no preset control is required in the event of fault, the program control may proceed to the processing at step 320 without conducting the processing at step 305. The storage system integrated managing means 14 informs the storage managing console 13, host managing console 11 or file server managing console 12 of the fault information (step 320). Alternatively, the storage system integrated managing means 14 may directly instruct the host 2, file server 3 and storage managing host 4 to conduct the preset control.

Figure 4:
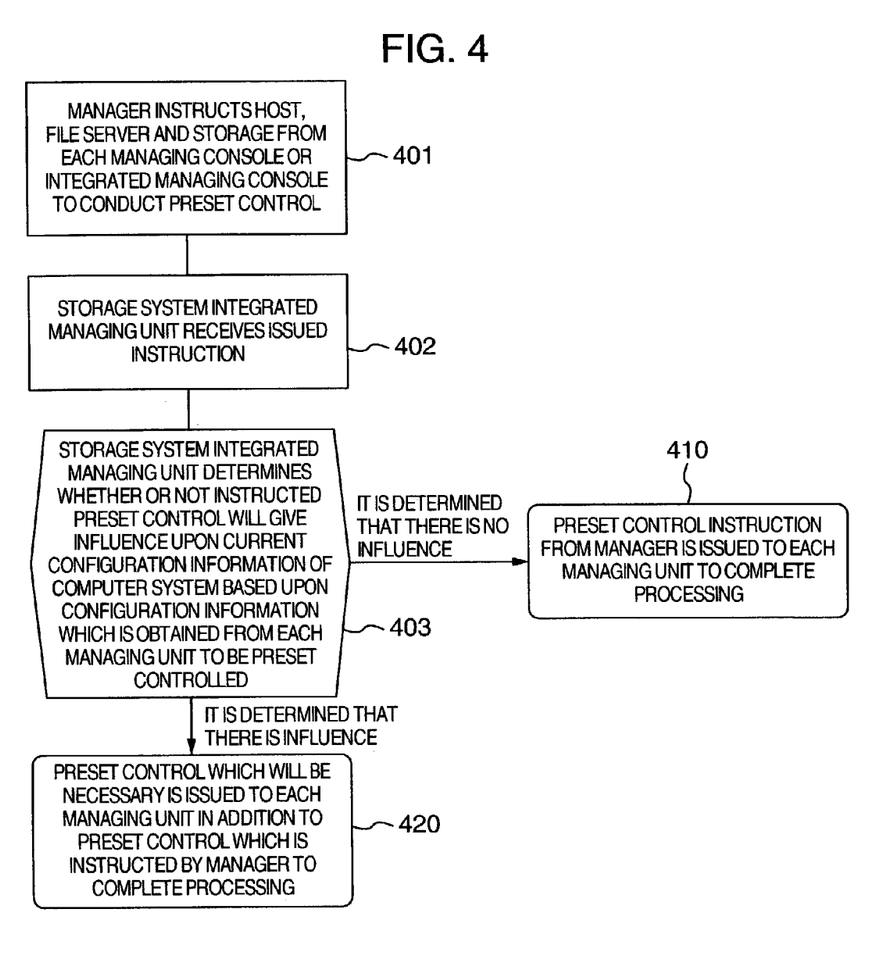
FIG. 4 is a flowchart showing a preset control processing.

Referring now to FIG. 4 which is a flowchart showing the process flow when the preset control is instructed from the management terminal 1 in the first embodiment.

The manager instructs each managing console of the management terminal 1 (host managing console 11, file server managing console 12, storage managing console 13) or the host 2, file server 3, storage 6 and the like to conduct preset control from the above-mentioned integrated managing console (step 401). The storage system integrated managing means 14 receives an instruction which is issued at step 401. The storage system integrated managing means 14 determines based upon the information of FIGS. 5, 6, 7 which is obtained from each managing means (volume managing means 21, file sharing managing means 31, storage managing means 41) of the host 2, file server 3 and storage 4 which are objects of preset control, whether or not the preset control instruction will give an influence upon the configuration information of the computer system (step 403). Now, a preferable case of the determination whether or not an influence will be given will be described. The case which will be described is only an example. Any configuration information which is obtained from each managing means will be considered for the determination in this invention. For example, when the disk volume 61 in the storage 6 is deleted, the storage system integrated managing means 14 determines that an influence will be given with reference to the table information of FIGS. 5, 6 and 7, if there is any host 2 or file server 3 which is connected to its disk volume 61. If there is no host 2 or file server 3 which is connected to the disk volume 61, it determines that no influence will be given.

If it is determined that there is an influence at step 403, the storage system managing means 14 specifies a preset control which will be necessary for each managing means (volume managing means 21, file sharing means 31, storage managing means 41) in addition to the preset control which is instructed by the manager and issues these preset controls in an appropriate order (step 420). A preferable example in which preset controls which will be necessary in addition to the preset control which is instructed by the manager will be issued in an appropriate order will be described. The present invention is not limited to this example, and the present invention is applicable to other orders. For example, the storage system managing means 14 receives an instruction to delete the disk volume 61 in the storage 6. If there is a host 2 or file server 3 which is connected to the disk volume 61, it is necessary to conduct disk volume mount inhibition by the volume managing means 21 or deletion of the file sharing by the file sharing managing means 31 prior to the deletion of the disk volume. Specifically, the storage system managing means 14 determines based upon the table information of FIGS. 6 and 7 whether or not there is any devices 2, 3 which mount the disk volume 61 which will be deleted, and whether or not there is any file server which mounts the disk volume 61 which will be deleted and shares a file for that volume. If there is a file server which mounts the disk volume 61 to be deleted and conducts file sharing for its volume, the storage system managing means 14 instructs the file sharing means 31 to delete the sharing name 701 which shares a file. If there are devices 2, 3 which mount the disk volume 61 to be deleted, the storage system managing means 14 instructs the volume managing means 231 to delete the mount point 601 of FIG. 6.

If there are no devices 2, 3 which mount the disk volume 61 to be deleted, the storage system managing means 14 issues as received instruction of preset control from the manager to each managing means (volume managing means 21, file sharing means 31, storage managing means 41) (step 410).

Figure 2:
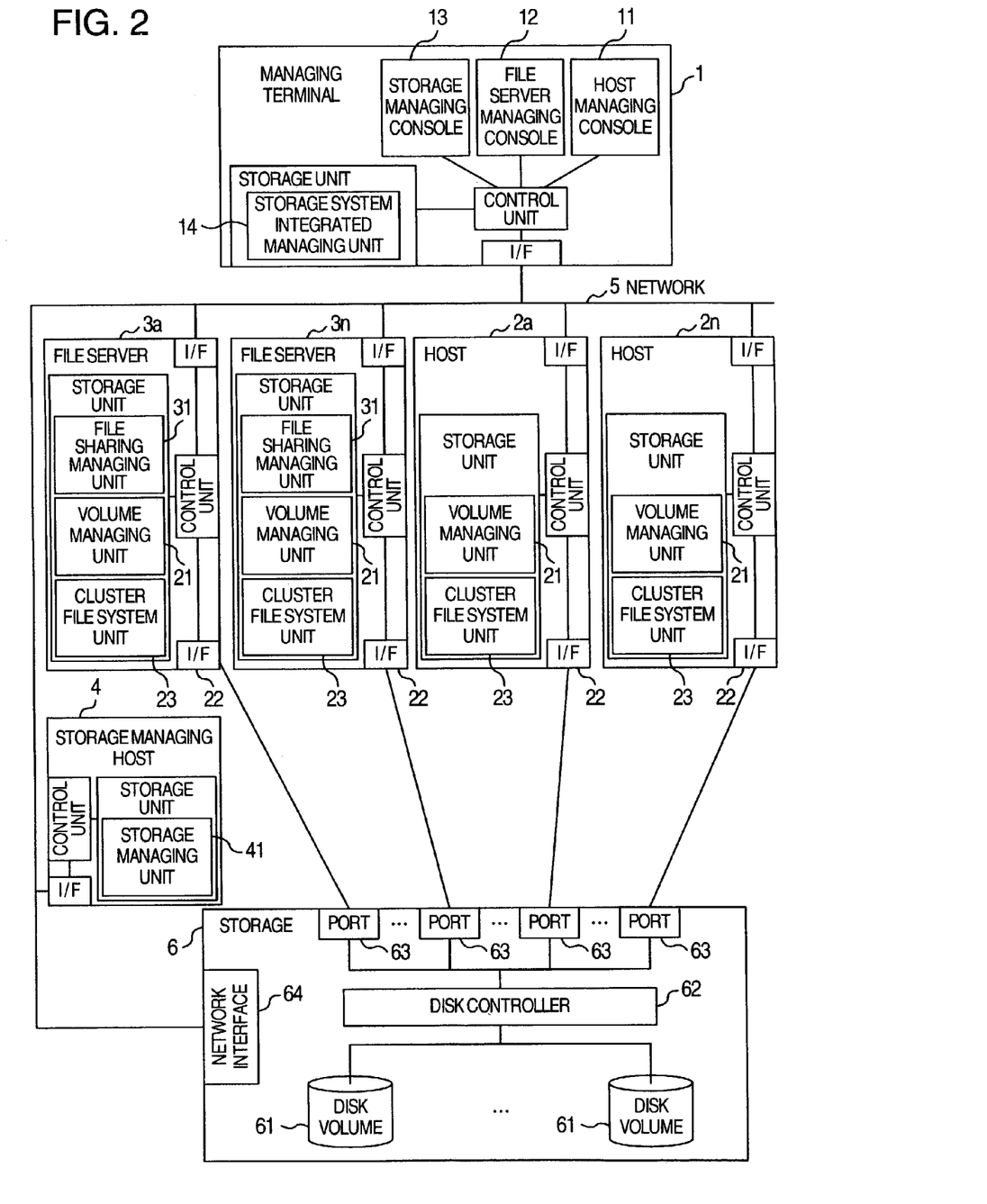
FIG. 2 is a schematic block diagram showing a second embodiment of the present invention.

Referring now to FIG. 2. There is shown the configuration of a second embodiment of the present invention. Differences between the first and second embodiment which are shown in FIGS. 1 and 2 will be described.

In addition to the configuration which has been described with reference to FIG. 1, cluster file system means 23 is disposed on the host 2 and the file server 3 in FIG. 2.

The file server 3 processes an access request in unit of file from the client computer as described above based upon the table information of FIG. 8 which will be described and a cluster file system means 23 issues an access request to a host 2 which is able to execute an access to the volume in the level of block. This implements an NAS over SAN which enables an access request in unit of file at a high rate. Alternatively, the cluster file system means 23 may process the access request in the level of block in the host 2 for issuing an access request to the file server 3 which is able to execute an access to the volume in unit of file. The function of the cluster file system means 23 is implemented by the fact that software (program) for managing and controlling the information between the host 2 and the file server 3 is executed on the operating system by the control unit (for example CPU) of the host 2 or the file server 3.

Also in the configuration of FIG. 2, associated operation of each managing means is necessary in the event of fault or preset control in the computer system similarly to the case of FIG. 1. Accordingly, the storage system integrated managing means 14 is disposed and processing for solving the problems is carried out similarly to the case in FIG. 1.

A major difference between the processing of FIGS. 1 and 2 resides in that the cluster file system means 23 will be managed by the managing means which conducts reference of the configuration information and preset control when processing is conducted in the event of a fault and present control. In the embodiment of FIG. 2, presetting of control information between the host 2 and the file server 3 which is conducted by the cluster file system means 23 will be managed for processing in the event of a fault and preset control. In other words, it is necessary to conduct processing to make determination whether or not the volume managing means 21 and the file sharing managing means 31 will be influenced when a fault occurs in the host 2 or the file server 3 or they are preset controlled.

Figure 8:
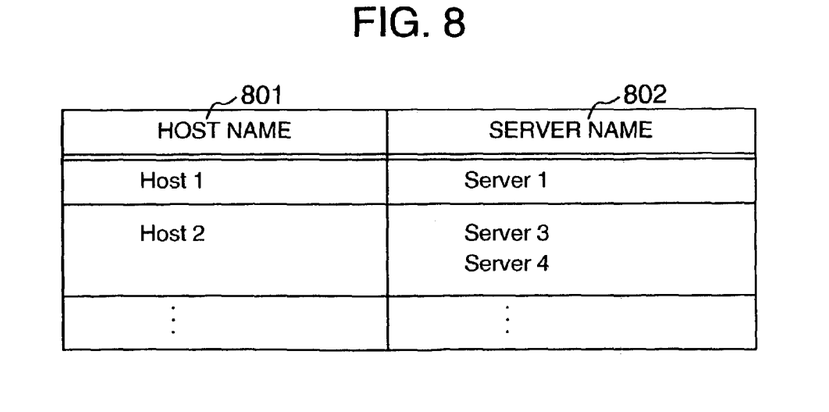
FIG. 8 is a table showing exemplary configuration information managed by cluster file system means.

FIG. 8 is an example of a table for sending the received access request to the volume 61 via the other host 2 or the file server 3. The table of FIG. 8 is held by the cluster file system means 23.

The connection relationship between each host 2 and file server 3, identification information 801 of the host and identification information 802 of the file server which is connected to each host is shown on the table of FIG. 8. Since server name of "Server 1" is shown in the host name 801 of "Host 1", an access request to "Server 1" by executing an application program is sent to the volume 61 via the host 2 of "Host 1". The present table information is only an example. Any type of information may be present on the table if the information defines which connection relationships are established between each host 2 and file server 3. Alternatively, the cluster file system means 23 of each host 2 and file server 3 may hold a table showing other devices through which an access request is bypassed for each volume 61 instead of table of FIG. 8 and for presetting devices 2, 3 through which the access request is bypassed in unit of volume.

The processing in the embodiment of FIG. 8 is substantially identical with that of FIGS. 3 and 4 except that the information on the table of FIG. 8 will be considered for the determination.

In other words, the storage integrated managing means 14 manages the host 2, file server 3 and storage 6 in such a manner that preset control is carried out without causing any contradiction as a whole of the system in accordance with the fault information or configuration change information and the contents of FIGS. 5, 6, 7 and 8 when a fault occurs or when the configuration of the storage is changed.

As mentioned above, in accordance with the present invention, a managing console to which the fault is to be informed is automatically specified by the integrated managing means which is associated with each managing means in a computer system having a storage when a fault occurs in the storage and the computer having a connection relationship with the faulty storage is automatically specified so that control which is necessary in each computer can be automatically conducted.

Use of integrated managing means makes it possible to adjust the preset control which is instructed by the manager independently of the storage and the computer or the providing form of computer, so that the whole of the computer system can be preset controlled without causing contradiction. The present invention provides a configuration and method for carrying out preset control of the whole of the system without causing contradiction when the fault occurs or when the configuration is changed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A managing computer for managing a computer system,
    wherein said computer system comprises:
        a storage apparatus including a plurality of disk units for storing data therein, an interface connected to a network, and a disk controller responsive to an access request for data indicated by a logical address via one of a plurality of I/O ports, for accessing data stored in said disk units by converting the logical address into a physical address, with said plurality of disk units forming a plurality of logical disk volumes;
        a plurality of hosts each thereof including a control unit for accessing data on a logical block basis to said storage apparatus by using the data access request via a first interface connected to one of said I/O ports of said storage apparatus, a second interface connected to said network, and a storage unit connected to said control unit, said storage unit including a first table storing mount point identifiers of disk volumes that the particular host recognizes for access;
        a plurality of file servers each thereof including a control unit for accessing data on a logical file basis to said storage apparatus by using the data access request via a first interface connected to one of said I/O ports of said storage apparatus, a second interface connected to said network, and a storage unit including a second table storing mount point identifiers of disk volumes that the particular file server recognizes for access, and a third table storing sharing identifiers of files that the particular file server recognizes, with each of the files being constituted by one or more logical data blocks, names of client computers permitted to access the files, and types of access rights to the files permitted by the client computers In a correspondence relationship manner; and
        a storage managing host for managing said storage apparatus via a first interface connected to said network, said storage managing host including a control unit for receiving information as to status of said storage apparatus, and a storage unit including a fourth table storing correspondence relationships between disk volumes and hosts or file servers connected thereto, and
    wherein said managing computer is connected to said storage apparatus, said plurality of hosts, said plurality of file servers, and said storage managing host via an interface connected to said network,
    wherein said managing computer acquires contents of said first, second, third, and fourth tables, and
    wherein, when receiving, from said storage managing host, a notice of an occurrence of a failure on a disk volume in said storage apparatus, said managing computer:
        (a) determines from the fourth table whether or not there exists a host or file server connected to said failed disk volume;
        (b) if there exists a host or file server connected to said failed disk volume in step (a), determines from the second and third tables whether or not inhibition of an access by at least one client computer to a file of the failed disk volume is necessary;
        (c) if there exists a host or file server connected to said failed disk volume in the step (a), determines from the second and third tables whether or not inhibition of file sharing by client computers of a file of the failed disk volume is necessary;
        (d) if there exists a host or file server connected to said failed disk volume in the step (a), determines from the second and third tables whether or not inhibition of an access by the host or file server of the failed disk volume is necessary;
        (e) if the inhibition of an access by said at least one client computer is necessary in step (b), enables an associated file server to inhibit connection between said at least one client computer and the failed disk volume;
        (f) if the inhibition of file sharing is necessary in step (c), enables the associated file server to inhibit file sharing between associated client computers and the failed disk volume;
        (g) if the inhibition of an access by the host or file server is necessary in step (d), enables the associated host or file server to inhibit disk volume mount for the failed disk volume.

2. The managing computer according to claim 1, wherein, when enabling the associated file server to inhibit the connection in step (e), said managing computer enables the associated file server to delete a name of said at least one client computer in its own third table.

3. The managing computer according to claim 1, wherein, when enabling the associated file server to inhibit the file sharing in step (f), said managing computer enables the associated file server to delete a sharing identifier corresponding to the associated client computers in its own third table.

4. The managing computer according to claim 1, wherein, when enabling the associated host to inhibit disk volume in step (g), said managing computer enables the associated host to delete a corresponding mount point in its own first table.

5. The managing computer according to claim 1, wherein when enabling the associated file server to inhibit disk volume in step (g), said managing computer enables the associated file server to delete a corresponding mount point in its own second table.

6. A method for managing a computer system by a managing computer,
    wherein said computer system comprises:
        a storage apparatus including a plurality of disk units for storing data therein, an interface connected to a network, and a disk controller responsive to an access request for data indicated by a logical address via one of a plurality of I/O ports, for accessing data stored in said disk units by converting the logical address into a physical address, with said plurality of disk units forming a plurality of logical disk volumes;
        a plurality of hosts each thereof including a control unit for accessing data on a logical block basis to said storage apparatus by using the data access request via a first interface connected to one of said I/O ports of said storage apparatus, a second interface connected to said network, and a storage unit connected to said control unit, said storage unit including a first table storing mount point identifiers of disk volumes that the particular host recognizes for access;

a plurality of file servers each thereof including a control unit for accessing data on a logical file basis to said storage apparatus by using the data access request via a first interface connected to one of said I/O ports of said storage apparatus, a second interface connected to said network, and a storage unit including a second table storing mount point identifiers of disk volumes that the particular file server recognizes for access, and a third table storing sharing identifier; of files that the particular fife server recognizes, with each of the files being constituted by one or more logical data blocks, names of client computers permitted to access the files, and types of access rights to the files permitted by the client computers in a correspondence relationship manner; and a storage managing host for managing said storage apparatus via a first interface connected to said network, said storage managing host including a control unit for receiving information as to status of said storage apparatus, and a storage unit including a fourth table storing correspondence relationships between disk volumes and hosts or file servers connected thereto, and wherein said managing computer is connected to said storage apparatus, said plurality of hosts, said plurality of file servers, and said storage managing host via an interface connected to said network, wherein said managing computer acquires contents of said first, second, third, and fourth tables, and wherein, when receiving, from said storage managing host, a notice of an occurrence of a failure on a disk volume in said storage apparatus, said method executed by said managing computer comprises the steps of:

(a) determining from the fourth table whether or not there exists a host or file server connected to said failed disk volume;

(b) if there exists a host or file server connected to said failed disk volume in step (a), determining from :he second and third tables whether or not inhibition of an access by at least one client computer to a file of the failed disk volume is necessary;

(c) if there exists a host or file server connected to said failed disk volume in the step (a), determining from the second and third tables whether or not inhibition of file sharing by client computers of a file of the failed disk volume is necessary;

(d) if there exists a host or file server connected to said failed disk a volume in the step (a), determining from the second and third tables whether or not inhibition of an access by the host or file server of the failed disk volume is necessary;

(e) if the inhibition of an access by said at least one client computer is necessary in step (b), enabling an associated file server to inhibit connection between said at least one client computer and the failed disk volume;

(f) if the inhibition of file sharing is necessary in step (c), enabling the associated file server to inhibit file sharing between associated client computers and the failed disk volume; and (g) if the inhibition of an access by the host or file server is necessary in step (d), enabling the associated host or file server to inhibit disk volume mount for the failed disk volume.

7. The method according to claim 6, wherein, when enabling the associated file server to inhibit the connection in step (e), said managing computer enables the associated file server to delete a name of said at least one client computer in its own third table.

8. The method according to claim 6, wherein, when enabling the associated file server to Inhibit the file sharing in step (f), said managing computer enables the associated file server to delete a sharing identifier corresponding to the associated client computers in its own third table.

9. The method according to claim 6, wherein, when enabling the associated host to inhibit disk volume in step (g), said managing computer enables the associated host to delete a corresponding mount point in its own first table.

10. The method according to claim 6, wherein, when enabling the associated file server to Inhibit disk volume in step (g), said managing computer enables the associated file server to delete a corresponding mount point in its own second table.

* * * * *